(12) United States Patent
McGlasson

(10) Patent No.: US 7,228,643 B2
(45) Date of Patent: Jun. 12, 2007

(54) METHOD OF GAGING ON GEAR LAPPING AND TESTING MACHINES

(75) Inventor: William D. McGlasson, Caledonia, NY (US)

(73) Assignee: The Gleason Works, Rochester, NY (US)

( * ) Notice: Subject to any disclaimer, the term of this patent is extended or adjusted under 35 U.S.C. 154(b) by 0 days.

(21) Appl. No.: 11/355,674

(22) Filed: Feb. 16, 2006

(65) Prior Publication Data

US 2006/0185184 A1    Aug. 24, 2006

Related U.S. Application Data

(60) Provisional application No. 60/654,439, filed on Feb. 18, 2005.

(51) Int. Cl.
*G01B 5/25* (2006.01)
(52) U.S. Cl. .......................................... 33/645; 33/655
(58) Field of Classification Search .. 33/501.7–501.19, 33/519, 613, 645, 655
See application file for complete search history.

(56) References Cited

U.S. PATENT DOCUMENTS

| | | | | | |
|---|---|---|---|---|---|
| 4,276,700 | A | * | 7/1981 | Tanno et al. | 33/501.9 |
| 4,322,889 | A | * | 4/1982 | Guenter | 33/501.9 |
| 4,539,753 | A | * | 9/1985 | Fitzpatrick | 33/613 |
| 5,292,212 | A | * | 3/1994 | Taylor et al. | 33/501.14 |
| 6,120,355 | A | | 9/2000 | Stadtfeld et al. | |

* cited by examiner

*Primary Examiner*—G. Bradley Bennett

(57) ABSTRACT

A system to replace or augment the common manual cone-gage method with a method that is highly automated on a CNC machine. Two cone-gage fixtures are employed, getting clamped into the gear and pinion workholding fixtures, respectively. But instead of mechanical contact, dial indicators, or other methods, a precision electronic touch probe is employed that, together with the CNC motion-controlled machine axes, can be used to measure and position gage fixture surfaces.

21 Claims, 3 Drawing Sheets

METHOD OF GAGING ON GEAR LAPPING AND TESTING MACHINES

This application claims the benefit of U.S. Provisional Patent Application No. 60/654,439 filed Feb. 18, 2005, the entire disclosure of which is hereby incorporated by reference.

FIELD OF THE INVENTION

The present invention is directed to a precise method for measuring and positioning gage fixture surfaces in a gear manufacturing machine.

BACKGROUND OF THE INVENTION

Lapping is a well established process for finishing the tooth surfaces of gears such as bevel and hypoid gears. It is a process that provides an economical alternative to other hard finishing processes for bevel gears and it has been used in most gear manufacturing applications.

In the lapping process, a pinion and ring gear are mounted, via appropriate workholding equipment, to respective spindles in a lapping machine that has the same basic design as a testing machine. In most instances of rolling of the gearset, the pinion is the driving member and the ring gear is braked. The gears are rolled in mesh and lapping compound, which can be a mixture of oil (or water) and silicon carbide or similar abrasive, is poured into the meshing zone. One example of a lapping or testing machine can be found in U.S. Pat. No. 6,120,355 to Stadtfeld et al.

Most lapping and testing machines have three degrees of freedom available for realizing relative motion between a ring gear and pinion. The first freedom being relative movement G in the direction of the ring rear axis Z, the second freedom being relative movement H in direction of the pinion axis X, and the third degree of freedom being distance V between the ring gear and pinion axes in the direction of axis Y which is usually arranged perpendicular to the X and Z axes. The distance V is also known as the "hypoid offset."

In lapping or testing processes, relative movement in the V and H directions effect positional changes in the contact pattern of the members of the gearset, in effect modifying the contact pattern. Lapping involves rotating the gear members in mesh with contact at a desired position on the tooth surfaces. Thus, the members are located at particular V and H positions along with a particular position G to effect the desired backlash.

The position of axes of machines used for lapping and testing bevel gearsets has often been gaged manually through the use of job-specific set-up gages sometimes known as cone gages. These gages are typically employed once or more per work shift to insure that the automatic machine axes are properly positioning the gear and pinion workpieces relative to one another. They can detect and compensate for many possible sources of error such as machine thermal growth, CNC scale errors, tooling dimension uncertainty, etc.

These cone gages are used in pairs, one member being clamped (chucked) in place of the gear into the gear spindle workholding equipment, and the other chucked in place of the pinion into the pinion spindle workholding equipment. The two members of a cone gage pair, therefore, have several mechanical features in common with the gear and pinion, respectively, sufficient to allow them to be held by the same workholding equipment.

When the machine axes are positioned to hold a gearset in the nominal running position designed for that gearset, the machine is in the "job position". A cone gage pair indicate a gage position. If the gage position is identical to the job position, then the cone gages can be referred to as absolute cone gages. The job position is defined in three dimensions which can be given as the "pinion cone," "gear cone" and "offset" (or typically also by the X, Y, and Z axes of the machine tool). In other words, a machine whose axes are positioned to hold a gearset in its nominal job home position will hold the associated cone gage members in a "zero" or "gage" position indicated by the gages themselves.

Some existing cone gages indicate the gage position of all three axes mechanically by having a surface of one gage member just touching a surface of the other. Others work with one or more high-precision dial indicators built into the cone-gages such that when the indicator reads zero, the axis in question is in the gage position. Still others work with a combination of both methods. For maximum accuracy, it has been historically preferable that for absolute cone gaging all three axes be brought into the job position simultaneously and that the cone gages indicate the gage position in all three dimensions simultaneously. In general, these cone-gage methods result in axes positioning accuracies of 0.0002 inch or less.

It can be noted that cone gages or the equivalent have been designed for angular bevel sets (gearset angles other than 90 degrees) and cylindrical gearsets as well.

Traditionally, absolute cone gages are operated manually by the machine operator or technician, specially trained for the operation. The operator clamps the gages into the workholding fixtures and then brings them carefully into engagement using machine manual mode commands to jog the axes into the job position as indicated by the gages. This frequent operation interrupts production and can be slow and tedious. Results can even be subjective, as when an operator judges the light metal-to-metal contact condition required by most of these gages.

SUMMARY OF THE INVENTION

The present invention provides a system to replace or augment the common manual cone-gage method with a method that is highly automated on a CNC machine. Two cone-gage fixtures are employed, getting clamped into the gear and pinion workholding fixtures, respectively. But instead of mechanical contact, dial indicators, or other methods, a precision electronic touch probe is employed that, together with the CNC motion-controlled machine axes, can be used to measure and position gage fixture surfaces.

DETAILED DESCRIPTION OF THE PREFERRED EMBODIMENTS

Figure 1:
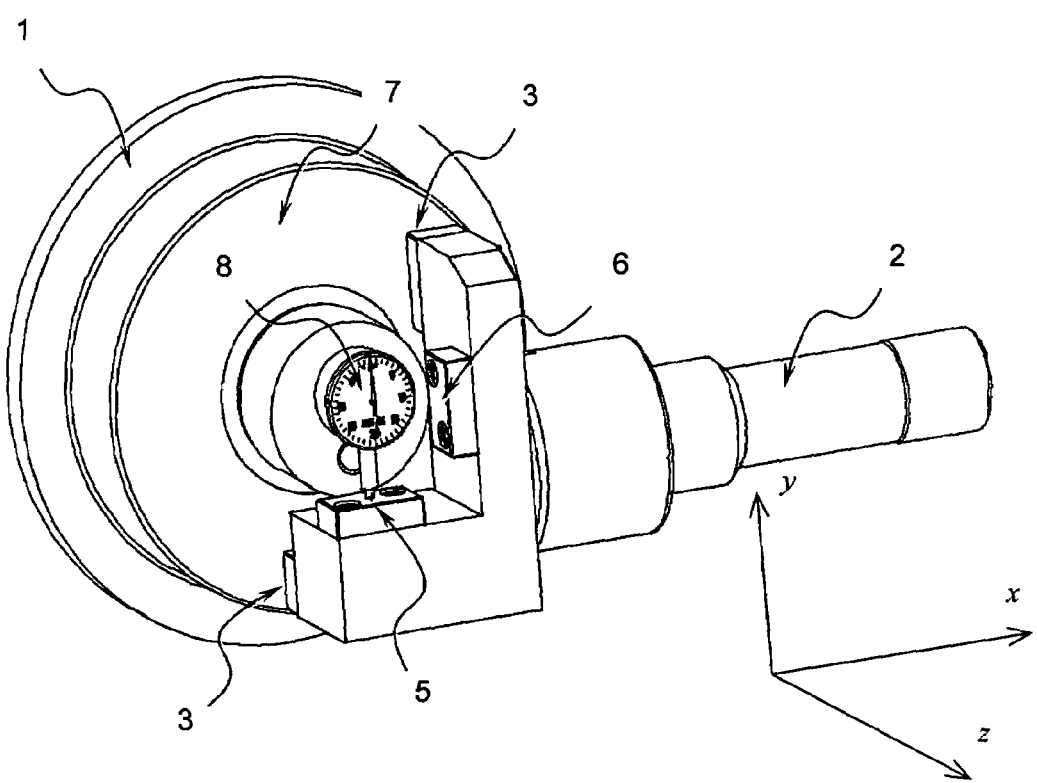
FIG. 1 illustrates a prior art example of typical cone gages with the gear and pinion members engaged with one another in the job (or zeros) position.

FIG. 1 shows an example of typical cone gage pair with the ring gear and pinion members engaged with one another in the gage position. The set of axes xyz shown indicates the directions that the two cone-gage members can be translated, by machine axis motions, relative to one another.

The pinion cone gage member 2 has two flat pads 3 that are first brought into light metal-to-metal contact with a flat face 7 of the gear cone gage member 1. The operator manually positions the machine in the z-axis direction to do this. This position becomes the ring gear cone gage position for that gearset.

It is also noted that when both pads 3 are in light contact, the rotation of the pinion member 2 is fixed, being forcibly aligned to the front face 7 of the gear member 1. Once this rotation is fixed, the orientation of pad 5 becomes known, being flat in the X-Z plane. The rotation of the gear member, on the other hand, is never known nor indeed needs to be for this method.

The ring gear member 1 has a dial indicator 8 mounted on a central hub. When the complete gear spindle is rotated by hand (machine spindle motor disabled) the orientation of the dial indicator can be changed. During this rotation, the front face 7 slides past the two pads 3 with light contact. This indicator can be oriented vertically to contact the lower pad 5 of the pinion fixture. The machine is then manually positioned in the Y-axis direction until the indicator reads zero. The indicator is manually rotated back and forth slightly across the pad to be sure to catch the closest position. This Y-axis position becomes the offset gage position for that gearset.

Finally, the gear spindle is rotated such that the dial indicator is oriented horizontally to contact the pad 6 of the pinion fixture. The machine is then manually positioned in the X-axis direction until the indicator reads zero. The indicator is manually rotated back and forth slightly across the pad to be sure to catch the closest position. This X-axis position becomes the pinion cone gage position for that gearset.

The zero position of the dial indicator must itself be adjusted and verified, since one turn of the bezel on a typical indicator can "uncalibrate" the measurement. For this purpose, additional gage piece(s) are provided that can be temporarily installed on the gear cone fixture to calibrate the indicator prior or during use on the machine.

The present invention provides a system to replace or augment the common manual cone-cage method with a method that is highly automated on a CNC machine. As in the prior-art devices, two cone-gage fixtures (gear cone-gage fixture and a pinion cone-gage fixture) are employed, getting clamped into the gear and pinion workholding fixtures, respectively. But instead of mechanical contact, dial indicators, or other methods, a precision electronic touch probe is employed that, together with the CNC motion-controlled machine axes, can be used to measure and position gage fixture surfaces.

For gage accuracy, it is preferable that the machine axes be positioned exactly at or very close to the job position when the gaging operation takes place (absolute cone gaging). In other words, when the probe trigger(s) are received which result in gaging a particular machine axis, not just that axis but all others as well should be at or very close to the job position. Most prior art manual cone gages are of the absolute type and achieve this goal implicitly.

With the present inventive device and method, however, the actual machine axis positions at which the probe trigger signal(s) are received (i.e. the gage position) can be displaced from the job position. This displacement is typically small for two of the axes, but can be significant in the offset axis, having essentially the same magnitude as the hypoid offset value itself (often around 1.5 inches for many automotive applications) for the associated gearset. Thus, the gage position is not identical to the job position, an approach that may be called displaced cone gaging.

The further that the gage position is displaced from the job position, however, the greater the possible error in knowing the true job position can become. This is due to imperfections in the machine base and axes manufacture, position feedback devices, thermal growth, and other such effects.

Part of the operation of almost all prior art devices has been to bring one or more flat surfaces of one gage member into light metal-to-metal contact with one or more flat surfaces of the other member. This has served not only to gage one of the machine axes (typically the axis normal to the flat surfaces) but it has also served to fix the rotation of at least one of the members. With the present inventive method, it has been recognized that automatic detection of the light metal-to-metal contact condition is difficult to achieve with the sensors and controls commonly and economically available, and therefore a method has been devised that eliminates the need for such an operation.

The pinion cone-gage fixture 10 (FIG. 2) is an element with mechanical features sufficiently similar to the associated gearset pinion member, typically a shank 12 and back mounting face 14, so that the gage can be clamped into the workholding fixture in place of a pinion.

Figure 2:
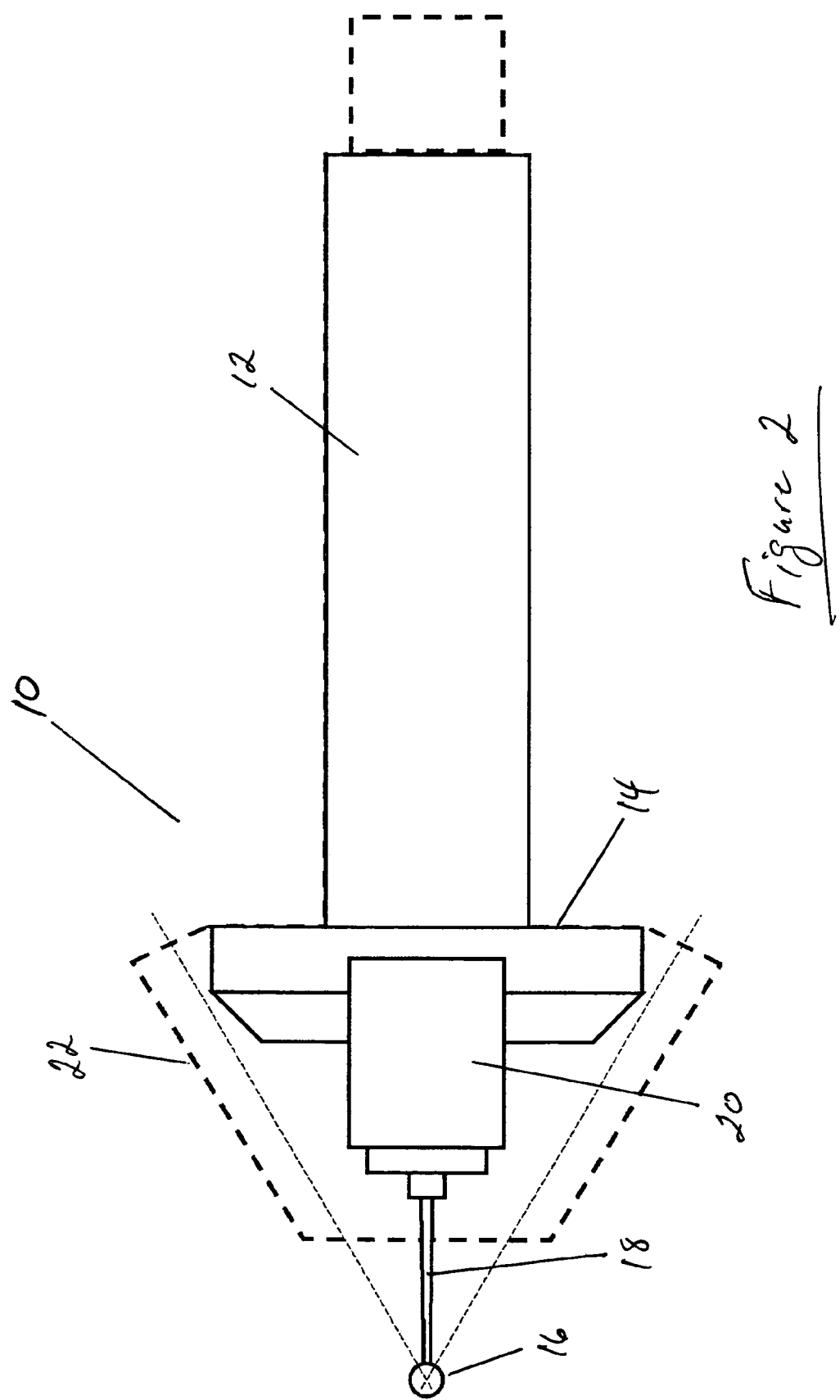
FIG. 2 illustrates a pinion cone-gage fixture utilized in the inventive gaging method.

A contacting touch probe is a precision component available in many configurations from many manufacturers, typically consisting of a spherical tip 16, stylus 18, and probe body 20 as shown in FIG. 2. An electrical signal is generated indicating displacement of the probe tip by contact with some other body. For this invention, a probe that is sensitive to displacements in any three-dimensional direction (known in the art as 5- or 6-way sensitivity) is preferable.

The contacting probe is mounted in a cone-gage fixture, preferably the pinion fixture, such that the probe tip center lies in a known position relative to the fixture. Preferably, the probe tip center lies exactly on the fixture centerline, and moreover lies on the pitch cone apex of the associated nominal gearset member 22, were it to be theoretically overlaid upon the cone-cage fixture.

Placing the probe tip on the pinion centerline allows the method to operate without regard to the initial or operational rotational position of the spindle, workholding, or gage fixture.

Probe styles could be utilized that have other than straight styli. For example, stems that have one or more bends can be beneficial to provide clearance in different embodiments of the invention. The probe body can be fixed onto the cone-cage fixture, preferably in a position where the probe tip still lies directly on the fixture centerline.

The gear cone-gage fixture 30 (FIG. 3) is an element with sufficient mechanical similarity to its associated ring gear that it can be clamped into the ring gear workholding device identically to a ring gear. For common ring-type gear members, the cone gage 30 would preferably provide a back seating surface 32 and a bore 34 similar to the back seating surface and bore of a ring gear member.

Figure 3:
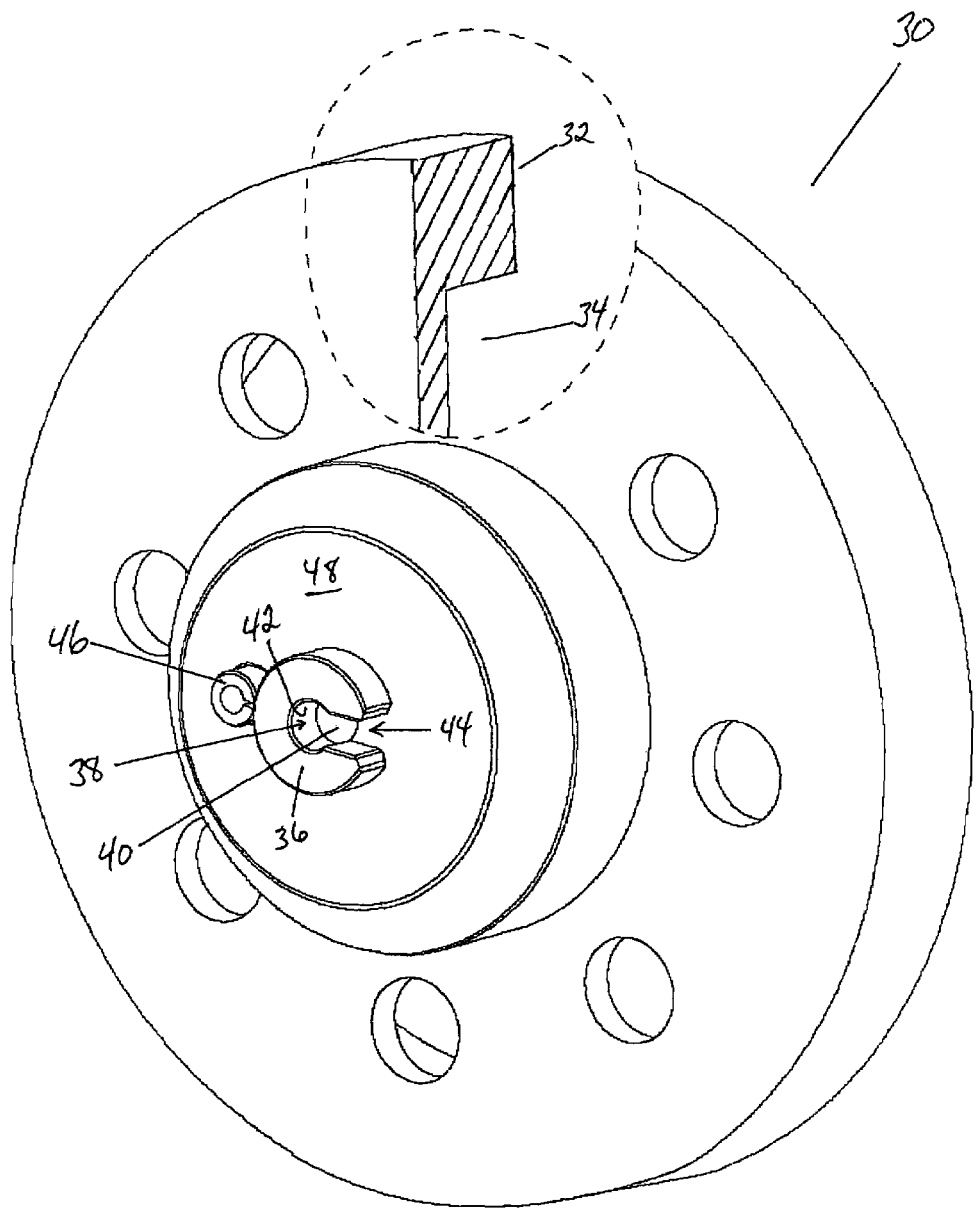
FIG. 3 illustrates a gear cone-gage fixture utilized in the inventive gaging method.

In operation, the probe tip 16 may be brought into contact with several features belonging to the gear-cone gage fixture 30 of FIG. 3. One of these features, the axis gaging target 36, is a preferably cylindrical projection in the center of the fixture. Into this projection is machined a precision cylindrical bore 38 coaxial with the fixture centerline. The diameter of this bore is larger than the diameter of the probe tip, preferably between 2 and 10 times larger. A precise flat bottom 40 to this bore is machined or alternatively obtained by an inserted second piece. The bore 38 together with its bottom portion 40 can be referred to as the "pocket". The pocket target provides surfaces for probe contact that allow gaging of machine axes X, Y and Z, and is a much simpler feature to manufacture accurately than the series of distinct pads at different orientations of the prior art manual cone gages.

Since the pocket is coaxial with the ring gear spindle centerline and is manufactured with sufficient precision, then the location of the surfaces of the pocket is ideally not dependent on the rotation of the gear spindle, workholding fixture, or gear cone-cage fixture.

A home position can be defined to describe the relative position of the gear and pinion cone-gage fixtures when the probe tip 16 is positioned along the centerline of the pocket and the probe tip center is some defined distance away from the pocket bottom 40.

In use, the probe tip 16 from the pinion cone-gage fixture 10 will be placed into the bore 38 for the purpose of contacting the surface 42 and bottom portion 40 of the bore 38. In many cases, and depending on the geometry of the probe stem, a slot 44 must be made to provide clearance for the probe stem 18. This slot 44 has a width preferably less than the diameter of the bore 38 and is sufficiently larger than the probe stem 18 to allow the ring gear spindle to be rotated some amount, preferably more than 5 degrees, without contacting the stem 18. The slot 44 could have parallel or non-parallel sides or other geometry as is appropriate to optimize for clearance.

It is advantageous to allow the initial manual or automated installation of the fixtures into their respective workholding devices to occur at an arbitrary rotational position. The need (in some realizations), however, to position the gear-spindle such that the slot 44, if required, of the axis gaging target 36 aligns with the probe stem 18 gives rise to the need to automatically detect and control the angular position of the gear cone-gage fixture 30. Since the slot 44 has been created to provide clearance to the probe stem 18, when in the measurement position, even as the gear spindle is rotated by some amount, preferably at least 5 degrees, then there is no great accuracy requirement to the detection and positioning of the slot 44.

The probe 10 itself is used to detect the angular position of the ring gear cone gage fixture. Some mechanical orientation target is provided on the gear cone-cage fixture that can be sensed by the probe. This can be as simple as a single protrusion having a known positional relationship to the slot 44. For instance, a preferable implementation includes a dowel 46, extending from the run-out face 48 of the ring gear cone-gage fixture. As the gear spindle is rotated, preferably by automatic control, and with the probe positioned in a slight interference position to the path of the dowel, the probe signal will be triggered when dowel 46 is contacted, and the position of the slot 44 will be known by the positional relationship of the dowel 46 to the slot 44. Depending on the initial random orientation, up to nearly 360 degrees of gear spindle rotation may be required before probe contact is made.

The time required to conduct this operation may not be objectionable, since the gear fixture run-out check, described below, requires preferably more than 270 degrees and as much as 360 degrees of rotation, and these two operations can be combined into one rotation.

Other types of targets can be devised, including holes, cams, ramps, etc. Targets that by virtue of angles, ramps, or cams can provide relative angular information on the slot 44 location from just the first or first several closely-spaced probe hits. These may allow more direct and faster positioning of the ring gear spindle to its aligned position.

In addition to the axis gaging and orientation targets, the ring gear cone-gage fixture can optionally have a front face target 48. This front face target is provided for axial run-out measurements that can insure the ring gear cone gage fixture, workholding device, and machine spindle are properly installed and operational. This kind of self-qualification check can be very important in automated systems where human eyes may not be watchful for problems.

The front face target 48 consists of a precision flat surface in a plane normal to the axis of the ring gear cone-gage fixture. The plane should preferably extend fully around the axis such that probing of the plane can be conducted at any gear-spindle position.

A protective rim, cover or shield can be added or machined into the gear cone-gage fixture 30 to surround and protect the axis gaging target 36 from damage during handling or use. For instance, a circular channel can be machined into the axis gaging target protrusion 36 separating the outer protective rim portion from the inner precision portion, such that a collision during handling may mark or bend the outer rim without marring or displacing the precision target surfaces of the inner portion.

To use the invention on a machine, preferably a bevel gear lapper or tester, the two cone cage fixtures 10, 30 are installed either manually or by means of an automation system. Once properly seated and clamped into the workholding devices (which themselves are properly seated and fixed in the machine spindles) the electrical or other utility connections are made, preferably one electrical cable connecting the pinion cone-gear fixture to the machine controller as required to transmit the probe trigger signal. Alternatively, a wireless transmitting device may be utilized to transmit the probe trigger signal.

The fixtures are operated under automatic or computer control according to a program that is specifically written or adapted to accommodate the active machine, workholding devices, and gearset type. Therefore, the computer controller has access to many nominal dimensions and geometric data related to the process.

The automatic cycle that operates the machine and cone gage system can be comprised of many parts or features. These features can be brought together in different sequences, but a preferred sequence will be described.

A first embodiment (optional) of the inventive gaging cycle measures the probe tip run-out behavior as a function of pinion spindle rotation. This measurement can help identify a number of problems with the probe system, pinion cone-gage fixture, pinion workholding device, pinion spindle, and other elements.

By means of motion control of the machine axes, the probe tip 16 is first brought into proximity with some portion of the flat face 48. The flat face is then probed by moving the probe tip towards the surface, preferably in a direction normal to that surface, until contact is made and the trigger signal is given. The machine axis positions are recorded as a result of the trigger signal by known means. The probe is then backed away from the surface so the probe tip comes out of contact.

The pinion spindle can then be optionally rotated to one or more other positions, and the above probing steps repeated. If a plurality of probing operations are made at different pinion spindle positions (preferably three or more equally spaced), then an estimate of probe tip run-out can be made by known means. This run-out can originate from many sources including a bent probe stylus, improper fixture seating, machine spindle problems, etc.

A second embodiment (optional) of the inventive gaging cycle measures the run-out behavior of the flat face 48 as a function of ring gear spindle rotation. This measurement can help identify a number of problems with the ring gear cone-gage fixture, gear workholding device, gear spindle, and other elements.

By means of motion control of the machine axes, the probe tip 16 is first brought into proximity with some portion of the flat face 48. The flat face is then probed by moving the probe tip towards the surface, preferably in a direction normal to that surface, until contact is made and the trigger signal is given. The machine axis positions are recorded as a result of the trigger signal by known means. The probe is then backed away from the surface so the probe tip comes out of contact.

The ring gear spindle can then be optionally rotated to one or more other positions, and the above probing steps repeated. If a plurality of probing operations are made at different gear spindle positions (preferable three or more equally spaced), then an estimate of flat face surface (axial) run-out can be made by known means. This run-out can originate from many sources including a improper damaged or warped flat face, improper gear cone gage or workholding fixture seating, machine spindle problems, etc.

A third embodiment of the present invention results in rotationally positioning the ring gear spindle such that the probe tip 16 can be moved inside the pocket 38 without interference between the target and the probe stem or stylus 18. An alignment protrusion 46 from the flat face is present, and as the gear spindle rotates, this protrusion naturally moves in a circular path about the axis of rotation. The probe can be positioned to interfere slightly with this protrusion such that contact is made and the trigger signal is generated at some location within the ring gear spindle rotation. A known relationship exists between the position of the protrusion 36 and the position of the slot 44 such that the spindle position required to place the slot in alignment with the probe stem is known.

The second and third embodiments, moreover, can be combined to accomplish both purposes within approximately one revolution of the ring gear spindle or less. If the position required for proper contact with the alignment protrusion 46 is also the position used for run-out measurements upon the flat face 48, then at some point during the ring gear spindle rotations, between run-out measurements, the probe trigger will occur by contact with the alignment protrusion 46.

Once the slot 44, if present, has been brought into alignment with the probe stem 18, another embodiment of the inventive method, gear-cone gaging, can begin. The probe tip 16 is positioned along the expected centerline of the pocket target 38, and then moved towards the pocket bottom 40 until contact signal received. At this point, the gear-cone axis position can be gaged, based on the very accurate fore-knowledge of the dimension from the ring gear cone-gage fixture back face 32 to the pocket bottom 40. Preferably, this dimension corresponds to the gear cone value of the associated nominal gearset, such that the machine gear cone axis gage position is just one probe tip radius away from the job position. Alternatively, the ring gear cone-gage fixture can be constructed with knowledge of the intended probe tip radius such that when contact is made, the machine gear cone axis is at the job position.

Yet another embodiment of the inventive method, offset-axis gaging, can now occur. The probe tip 16 is positioned along the expected centerline of the pocket 38, slightly away from contact with the pocket bottom 40. The machine offset axis is used to move the probe tip 16 until contact is made with the pocket wall surface 42. This axis is exercised in both directions to contact points on either side of the pocket 38, and a middle position is found between the two. This becomes the offset-axis gaged position at zero. (Note that typically the job position is an inch or more away from this position due to hypoid offset.)

Another embodiment of the present invention, pinion-cone gaging, can now occur. The probe tip 16 is positioned at the newly revised offset-axis zero point and slightly away from contact with the pocket bottom 40. The pinion cone axis is then moved until the probe tip 16 makes contact with the pocket wall 42 in a position generally opposite from the slot 44. With fore-knowledge of the pocket bore diameter and the probe tip radius, the center of the pocket in the pinion cone direction can be found, which becomes the pinion cone gaged position.

Together, these three gaged positions—(1) gear-cone, (2) offset, and (3) pinion-cone—determine a displaced job gage position.

The job gage position is theoretically identical to the job position with exception of the offset axis (the hypoid offset distance), which is displaced from the actual nominal job position to the zero point. Here, an offset-axis position of zero refers to the position where the gear cone and pinion cone axes intersect, as gaged by determining the center of the target bore in the offset-axis direction.

Theoretically, therefore, for gearsets with a hypoid offset, the offset axis need only be repositioned by the amount of the nominal offset in order to position the machine at the job position. And in many cases, doing so may result in sufficiently accurate and entirely satisfactory machine gaging. A number of significant variables or uncertainties have been gaged away by this method of displaced gaging. Primary sources of error such as spindle axial growth, machine gaging errors, and others have been essentially eliminated.

But, as the offset axis traverses from the displaced to the actual job position, small secondary errors in machine axis directions X, Y and Z can be encountered. These errors, if present, are primarily a function of machine build, axis orthogonality, straightness, position feedback accuracy, etc. The case can be made, however, that for a given machine, these types of small errors remain consistent over long periods of time such as shifts, days, weeks, months or even years.

Other primary sources of error, such as thermally-caused spindle growth, can change hourly as machine operation, ambient temperature, and other variables are encountered. Workholding tooling changes can also occur frequently and be a source of error.

If the secondary displacement-related errors, on any particular machine, do prove to be significant but consistent over longer periods of time, then the automatic gaging method herein described can be supplied with these error values in order to adjust the final machine gaged position accordingly. This enables the automated cone gaging method to achieve required accuracy and be employed relatively frequently to monitor and correct for the fast-acting sources of machine gaging error.

The more subjective and operator-intensive activity of manual absolute cone gaging can be applied, if necessary, at much longer intervals to monitor and qualify the results being obtained from the automated method, and to update the secondary error correction values.

The manual method of learning and accounting for secondary error sources to allow displaced gaging has been in use for many years already, as a means of reducing manual cone gaging activities in cases where the same pinion and gear workholding equipment is being used to lap or test interspersed right-hand and left-hand gearsets during production.

The machine offset axis is typically an inch or more below centerline for left hand pinions, and the same amount above centerline for right-hand pinions. The more common left-hand position is gaged with manual absolute set-up gages on a regular basis, but the right-hand position is gaged much less frequently. A small set of secondary errors, however, is learned or checked every time the right-hand gage equipment is employed, as incremental adjustments to the position predicted by applying the theoretical offset move to the gaged left-hand position.

It should be noted that the above method, primarily described as applied to a 5-axis machine tool configured for right-angle bevel gearing, can be extended to apply to a 5- or 6-axis machine tool appropriate for lapping or testing non-90 degree bevel gearing. In this case, the possible $6^{th}$ axis represents an angular adjustment allowing a range of angles between the pinion and gear axes.

The design, methods, and features of the invention remain fundamentally the same, but many probing motions become vector motions involving the coordinated positioning of two or more linear machine axes, and the resulting analyses and calculations get adjusted to recognize the angular relationships involved.

For gearset angles larger than 90 degrees, the slot formerly required for clearance around the probe stem may be modified or absent.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. Gaging components for determining the position of machine axes in a gear lapping or gear testing machine, said gaging components comprising at least one of:
   (a) a pinion cone gage fixture for clamping into a pinion workholding apparatus of the lapping or testing machine, said pinion cone gage fixture having a shank and a back mounting face generally the same as the shank and back mounting face of an actual pinion member to be lapped or tested, said pinion cone gage fixture further including a probe having a tip with a tip center, said probe being mounted in the pinion cone gage fixture whereby said tip center lies in a predetermined position relative to the pinion cone gage fixture, and,
   (b) a gear cone gage fixture for clamping into a ring gear workholding apparatus of the lapping or testing machine, said gear cone gage fixture having a bore and a back seating surface generally the same as the bore and back seating surface of an actual ring gear member to be lapped or tested, said gear cone gage fixture further including a front surface with an axis gaging target protruding outwardly from the front surface, said axis gaging target having an outer surface and a bore, said bore having a diameter larger than the diameter of said probe tip.

2. The gaging components of claim 1 wherein the probe tip center of the pinion cone gage fixture lies on the centerline of the pinion fixture.

3. The gaging components of claim 1 wherein the probe tip center of the pinion cone gage fixture lies on the pitch cone apex of said actual pinion member.

4. The gaging components of claim 1 wherein the probe comprises a straight styli or a styli having one or more bends.

5. The gaging components of claim 1 wherein said axis gaging target of the gear cone gage fixture includes a flat bottom portion within said bore, said bore and said flat bottom portion defining a pocket.

6. The gaging components of claim 5 wherein the flat bottom portion of said bore is a machined surface.

7. The gaging components of claim 5 wherein the flat bottom portion of said bore is defined by an inserted element.

8. The gaging components of claim 1 wherein the axis gaging target is located in the center of the front face of the gear cone gage fixture.

9. The gaging components of claim 1 wherein the axis gaging target includes an outer surface that is cylindrical in shape.

10. The gaging components of claim 1 wherein said bore within said axis gaging target is cylindrical in shape, said bore being located coaxial to the centerline of the gear cone gage fixture.

11. The gaging components of claim 1 wherein said bore within the axis gaging target is of a diameter 2 to 10 times larger than the diameter of said probe tip.

12. The gaging components of claim 1 wherein said axis gaging target further includes a slot extending from the outer surface to the bore.

13. The gaging components of claim 12 further including an orientation target located on the front surface of the gear cone gage fixture, said orientation target being detectable by said probe and having a predetermined positional relationship with respect to said slot.

14. The gaging components of claim 1 additionally including a front face axial run-out target on said gear cone gage fixture.

15. The gaging components of claim 14 wherein said front face axial run-out target comprises a flat plane surface normal to the axis of the gear cone gage fixture.

16. The gaging component of claim 14 wherein said front face axial run-out target extends around the axis of the gear cone gage fixture.

17. A method of gaging to determine the position of machine axes in a machine for lapping or testing gears, said machine comprising a pinion spindle and a ring gear spindle with each spindle being rotatable about a respective axis of rotation, said pinion and gear spindles being movable with respect to one another in up to three mutually perpendicular directions (X, Y, Z), said method comprising:
   providing a pinion cone gage fixture releasably secured in said pinion spindle, said pinion cone gage fixture having a shank and a back mounting face generally the same as the shank and back mounting face of an actual pinion member to be lapped or tested, said pinion cone gage fixture further including a probe having a tip with a tip center, said probe being mounted in the pinion cone gage fixture whereby said tip center lies in a predetermined position relative to the pinion cone gage fixture, providing a gear cone gage fixture releasably secured in said ring gear spindle, said gear cone gage fixture having a bore and a back seating surface generally the same as the bore and back seating surface of an actual ring gear member to be lapped or tested, said gear cone gage fixture further including a front surface with an axis gaging target protruding outwardly from the front surface, said axis gaging target having an outer surface and a bore, said bore having an inner surface, a flat bottom portion and a diameter larger than the diameter of said probe tip, moving said probe tip within said bore in said up to three mutually perpendicular directions (X, Y, Z) to contact said flat bottom portion and predetermined locations on said inner surface of said bore so as to establish gear-cone, offset and pinion-cone positions.

18. The method of claim 17 wherein the axes of the pinion spindle and the ring gear spindle are angularly adjustable.

19. The method of claim 17 wherein said axis gaging target includes a slot extending from the outer surface to said bore.

20. The method of claim 19 wherein the gear cone gage fixture includes an orientation target located on the front surface thereof, said orientation target having a predetermined positional relationship with respect to said slot, said method further including:

contacting said orientation target with said probe and thereby determining the location of said slot.

21. The method of claim 17 wherein the gear cone gage fixture additionally includes a front face axial run-out target, said method further comprising:

contacting said front face axial run-out target with said probe at a plurality of locations on said target, determining axial run-out based on the measured positions of each of said locations.

* * * * *